United States Patent
Ho et al.

(10) Patent No.: US 12,056,590 B2
(45) Date of Patent: Aug. 6, 2024

(54) SYSTEMS AND METHODS FOR DIAGNOSING COMPUTER VISION MODEL PERFORMANCE ISSUES

(71) Applicant: CAPITAL ONE SERVICES, LLC, McLean, VA (US)

(72) Inventors: Chi-San Ho, Allen, TX (US); Micah Price, The Colony, TX (US); Yue Duan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/541,022

(22) Filed: Aug. 14, 2019

(65) Prior Publication Data

US 2021/0049499 A1    Feb. 18, 2021

(51) Int. Cl.
*G06N 20/20* (2019.01)
*G06N 5/02* (2023.01)
*G06N 20/00* (2019.01)
*G06V 10/764* (2022.01)
*G06V 10/778* (2022.01)
(Continued)

(52) U.S. Cl.
CPC ............ *G06N 20/20* (2019.01); *G06N 5/02* (2013.01); *G06N 20/00* (2019.01); *G06V 10/764* (2022.01); *G06V 10/7784* (2022.01); *G06V 10/95* (2022.01); *G06V 20/10* (2022.01); *G06F 17/18* (2013.01)

(58) Field of Classification Search
CPC ........... G06N 20/00; G06N 5/02; G06F 17/18
See application file for complete search history.

(56) References Cited

U.S. PATENT DOCUMENTS

2007/0011299 A1* 1/2007 Farkas ............... G05B 19/0426
                                                          709/224
2011/0191350 A1* 8/2011 Zhang .................... A61B 5/374
                                                          707/743
(Continued)

OTHER PUBLICATIONS

Song et al., "Machine Learning Models that Remember Too Much," ACM 2017 (Year: 2017).*

(Continued)

*Primary Examiner* — Kakali Chaki
*Assistant Examiner* — Kevin L. Smith
(74) *Attorney, Agent, or Firm* — Perkins Coie LLP

(57) ABSTRACT

Systems and methods for clustering data are disclosed. For example, a system may include one or more memory units storing instructions and one or more processors configured to execute the instructions to perform operations. The operations may include receiving, from a first client device, a classification data associated with a classification model and receiving feature data corresponding to the classification model output. The operations may include training a meta-model to predict the classification data based on the feature data and/or additional data associated with the classification data such as location data or environmental data. The operations may include generating a meta-model output based on the classification data, the feature data, and/or the additional data. The operations may include updating the classification model based on the meta-model output and transmitting the updated classification model to at least one of the first client device or a second client device.

18 Claims, 8 Drawing Sheets

(51) Int. Cl.
  *G06V 10/94* (2022.01)
  *G06V 20/10* (2022.01)
  *G06F 17/18* (2006.01)

(56) References Cited

U.S. PATENT DOCUMENTS

| | | | | |
|---|---|---|---|---|
| 2013/0304676 | A1* | 11/2013 | Gupta | G06N 20/00 706/12 |
| 2014/0047100 | A1* | 2/2014 | Lachapelle | H04L 43/08 709/224 |
| 2014/0187177 | A1* | 7/2014 | Sridhara | G06N 20/00 455/73 |
| 2014/0237595 | A1* | 8/2014 | Sridhara | G06F 21/566 709/224 |
| 2014/0317734 | A1* | 10/2014 | Valencia | G06F 21/552 726/22 |
| 2014/0379615 | A1* | 12/2014 | Brigham | G06N 3/126 706/11 |
| 2015/0356462 | A1* | 12/2015 | Fawaz | G06N 5/043 706/12 |
| 2016/0253498 | A1* | 9/2016 | Valencia | G06F 21/577 726/23 |
| 2017/0294010 | A1* | 10/2017 | Shen | G06K 9/6256 |
| 2019/0130292 | A1* | 5/2019 | N | G06N 3/0454 |
| 2019/0228547 | A1* | 7/2019 | Chandarana | G06T 11/008 |
| 2019/0244139 | A1* | 8/2019 | Varadarajan | G06N 20/10 |
| 2019/0294900 | A1* | 9/2019 | Li | G06V 40/70 |
| 2019/0354809 | A1* | 11/2019 | Ralhan | G06K 9/6264 |
| 2020/0012886 | A1* | 1/2020 | Walters | G06F 21/60 |

OTHER PUBLICATIONS

Jamshed Khan, "How next-gen AI accelerators will transform mobile machine learning," (Jun. 19, 2019). <https://heartbeat.fritz.ai/how-next-gen-ai-accelerators-will-transform-mobile-machine-learning-47d262db15d5> (Year: 2019).*

Moreas et al., "A Meta-Model for Crowdsourcing Platforms in Data Collection and Participatory Sensing" (IEEE 2014). (Year: 2014).*

Sun et al., "A Scenario Model Aggregation Approach for Mobile App Requirements Evolution Based on User Comments," APRES 2015 (Year: 2015).*

So Young Sohn, "Meta Analysis of Classification Algorithms for Pattern Recognition," IEEE (1999) (Year: 1999).*

* cited by examiner

SYSTEMS AND METHODS FOR DIAGNOSING COMPUTER VISION MODEL PERFORMANCE ISSUES

BACKGROUND

Classification models are widely used in many fields, including computer vision, science, engineering, finance, marketing, politics, demographics, health care, public health, environmental management, research, and other fields. Machine-learning classification models may be used to classify data. In some cases, a management system may provide a classification model to a remote computing device.

In some conventional systems, a classification model may classify data and provide classification results to a system without providing data used to generate the classification results. For example, a computer-vision classification model may execute on a user device and may classify an image on the user device, such as an image of a vehicle. The user device may transmit an image classification result without including a copy of the image of the vehicle due to a regulatory restriction, bandwidth or file-size limitations, a privacy policy, or the like. As another example, a health provider system may implement a classification model to classify patient data as belonging to a probable disease diagnosis of a patient. The health provider system may transmit the classification result to another system (e.g., a medical research system) without the corresponding patient data, due to regulations prohibiting the sharing of patient data.

Conventional approaches suffer from challenges when attempting to manage classification models without access to the data used to generate the classification results. A remote classification model may inaccurately classify source data or fail to classify source data (e.g., a model may produce a model error). Such failures may arise for a variety of reasons, including failures related to data quality and/or to a data collection protocol. However, without access to the data used to generate classification results, a conventional system may face difficulty when attempting to diagnose classification issues or improve classification results. Due to restrictions in data access, a conventional system may be unable to train a classification model using data that produces classification errors, for supervised or unsupervised model training, and a conventional system may be unable to improve classification model performance.

FIG. 1 illustrates results of an existing method for classifying data. Specifically, FIG. 1 shows an illustrative example of inputs grouped by results of a computer vision classification model for images of vehicles. A classification model used to generate the results of FIG. 1 may be part of an automobile-shopping system that identifies vehicles for sale based on classification model results. For example, a smartphone may capture an image of a vehicle, submit the resulting image to the classification model running on the smart phone, receive classification results that include a make and model of a vehicle, transmit classification results to a management system, and receive information about similar vehicles for sale at dealerships form the server.

In the example of FIG. 1, a management system may train a classification model using training data (e.g., using car images from dealer inventory databases) and provide the trained classification model to one or more remote devices. The classification model may include a convolutional neural network and/or another machine learning model. Images may be captured and/or stored on a remote device (e.g., a user may take a photo of a car in a parking lot using a smartphone). An instance of the classification model running on a remote device may predict a make and model of a vehicle in an image. But due to privacy policies or regulations, a management system may be unable to receive the photo of the vehicle. Accordingly, the remote device may provide a success or failure message associated with the classification result to a management system, without providing an image used to generate the classification result.

As shown, a classification model may successfully classify images 100 but may fail to classify images 102, 104, and 106. A failure may arise from environmental factors, image quality factors, image subject factors, and/or other factors. For example, ambient fog (102a), ambient rain (102b), a time of day or location without sufficient light (102c), and/or other environmental factors may cause classification model failures. As another example, high brightness (104a), low brightness (104b), blurriness (104c), low contrast (104d), and/or other image quality factors may cause classification model failures. Further, an image frame that provides an incomplete view of a subject (106a, 106b); an image frame that provides a view of multiple subjects, small subjects, or no subjects (106c); an image that contains an obscured subject (106d); and/or other image subject factors may cause classification model failures. As one of skill in the art will appreciate, still factors may result in classification model failures other than those depicted in FIG. 1.

In the example of FIG. 1 a conventional system may face challenges when attempting to improve performance of a classification model without access to data used to generate classification results. For example, conventional systems may train or retrain a machine-learning classification model using training data (e.g., images of vehicles from dealership inventory databases). However, training data may possess different characteristics from data used to generate classification results, and a trained classification model may produce inaccurate results when applied to non-training data.

For example, training data comprising dealership images may be generated by skilled photographers using high quality cameras under optimal conditions (e.g., ideal lighting, perspective, orientation, camera focus, etc.). In contrast, non-training data comprising user-generated photos of vehicles may be generated by unskilled photographers using low quality mobile device cameras under suboptimal conditions. Further, non-training data may comprise images accidentally submitted for classification or images of inappropriate subjects (e.g., images that contain no vehicles).

Without access to non-training data, conventional approaches may be unable to diagnose model performance issues because conventional approaches may have little or no information about non-training data used to generate classification results. Accordingly, training or retraining a classification model may not improve classification results. As a result, conventional approaches may waste computing resources and/or fail to improve accuracy or other aspects of model performance.

Therefore, in view of the shortcomings and problems with conventional approaches to diagnosing classification model performance issue, including machine vision model performance issues, there is a need for new approaches that improve the accuracy of classification models and computing efficiency when managing classification models.

SUMMARY

The disclosed embodiments provide novel methods and systems for improving classification model performance, including machine vision model performance. Enhanced performance may include increased efficiency and/or improved accuracy. Embodiments consistent with the present disclosure are rooted in computer technology and may include training and/or implementing: to use the output of an image feature extraction model (i.e., a "feature model") to diagnose issues with classification model performance. A feature model is a model that identifies characteristics (i.e., features) of data that may relate to classification results. For example, a feature model may generate a metric of image quality or detect an object, and a feature model may produce feature model output accordingly.

A meta-model may be trained to associate feature data with classification data. For example, a meta-model may be trained to associate low contrast images with classification model failure. Classification data may include any data associated with classification model output, including classification model output itself or data generated based on classification model output. Classification model output may include any data generated by a classification model.

Classification data may include a classification result. A classification result may include data indicating success or failure of a classification (e.g., binary data, categorical data, etc.). A classification result may include a score, a confidence interval, a cluster identifier, a label, meta-data, a class, a category, a measure of a likelihood that a classification result is accurate. In some embodiments, classification model output includes a classification result. In some embodiments, a classification result may be generated based on classification model output. For example, a classification result comprising an indicator of success or indicator may be generated based on whether the classification model output satisfies a criterion (e.g., meets a threshold). A classification result may include a level of confidence that a classification model output is accurate (e.g., a quantile such as the top 2%) or any other analysis of classification model output.

In this way, a meta-model may be used to improve classification model performance. Further, a meta-model may be used to generate improved data collection protocols. For example, based on meta-model output, a system may generate a data collection protocol that includes a data quality check or a prompt to retake a photograph. Accordingly, a meta-model may be configured to diagnose and improve performance of models used for machine vision.

Consistent with the present embodiments, a system for improving classification results is disclosed. The system may include one or more memory units storing instructions and one or more processors configured to execute the instructions to perform operations. The operations may include receiving, from a first client device, classification data associated with a classification model and receiving feature data corresponding to the classification data. The operations may include training a meta-model to predict the classification data, based on the feature data. The operations may include generating a meta-model output based on the classification data and the feature data. The operations may include updating the classification model based on the meta-model output and transmitting the updated classification model to at least one of the first client device or a second client device.

Consistent with the present embodiments, a method for improving classification results is disclosed. The method may include receiving, from a first client device, classification data associated with a classification model and receiving a feature data corresponding to the classification data. The method may include training a meta-model to predict the classification data, based on the feature data. The method may include generating a meta-model output based on the classification data and the feature data. The method may include updating the classification model based on the meta-model output and transmitting the updated classification model to at least one of the first client device or a second client device.

Consistent with other disclosed embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as a machine constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Consistent with disclosed embodiments, systems and methods to diagnose and improve classification model performance issues, including performance issues associated with a machine-vision model, without access to data used to generate classification results are disclosed. Embodiments consistent with the present disclosure may include generating classification model output and feature model output on one or more remote devices, transmitting the classification model output and feature model output to a meta-model, and training the meta-model to diagnose classification model performance issues. As explained above, disclosed systems and methods may provide accuracy, efficiency, and cost advantages over conventional approaches.

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 2:
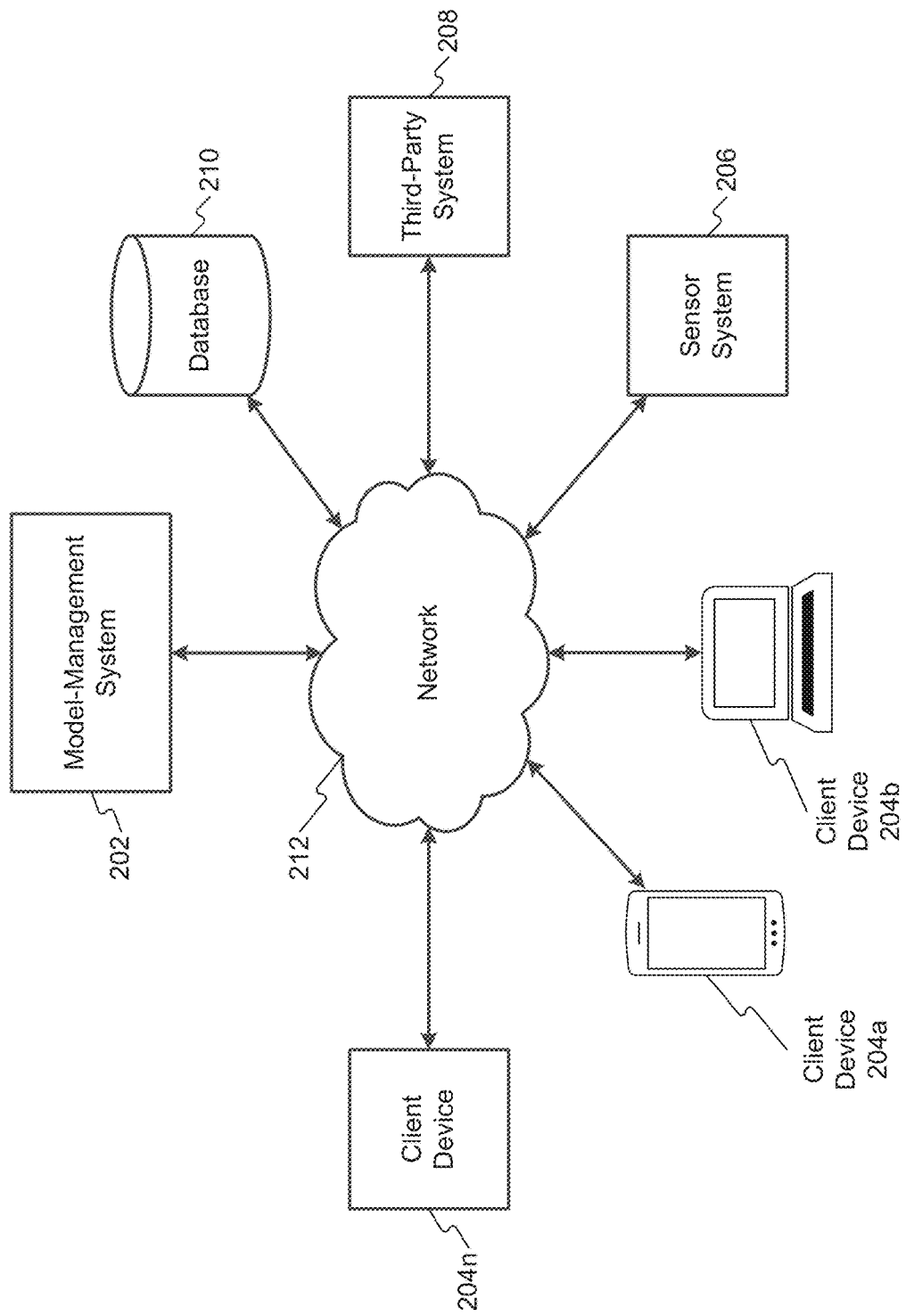
FIG. 2 is a block diagram of an exemplary system for managing classification models, consistent with disclosed embodiments.

FIG. 2 is a block diagram of exemplary system 200 for managing classification models, consistent with disclosed embodiments. As shown, system 200 may include a model-management system 202, one or more client device 204a, 204b,-204n, a sensor system 206, a third-party system 208, and a database 210. Components of system 200 may be connected to each other via a network 212.

In some embodiments, aspects of system 200 may be implemented on one or more cloud services designed to generate ("spin-up") one or more ephemeral container instances in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 200 can be arranged in various ways and implemented with any suitable combination of hardware, firmware, and/or software, as applicable. For example, as compared to the depiction in FIG. 2, system 200 may include a larger or smaller number of model-management systems, client devices, sensor systems, third-party systems, and/or databases. In addition, system 200 may further include other components or devices not depicted that perform or assist in the performance of one or more processes, consistent with the disclosed embodiments. The exemplary components and arrangements shown in FIG. 2 are not intended to limit the disclosed embodiments.

Model-management system 202 may include a computing device, a computer, a server, a server cluster, a plurality of server clusters, and/or a cloud service, consistent with disclosed embodiments. Model-management system 202 may include one or more memory units and one or more processors configured to perform operations consistent with disclosed embodiments. Model-management system 202 may include computing systems configured to generate, receive, retrieve, store, and/or provide models and/or data, consistent with disclosed embodiments. Model-management system 202 may include computing systems configured to generate and train models, consistent with disclosed embodiments. Model-management system 202 may be configured to receive data from, and/or transmit data to other components of system 200 and/or computing components outside system 200 (e.g., via network 212). Model-management system 202 is disclosed in greater detail below (in reference to FIG. 4).

Client devices 204a, 204b,-204n may include one or more memory units and one or more processors configured to perform operations consistent with disclosed embodiments.

In some embodiments, client devices 204a, 204b,-204n may include hardware, software, and/or firmware modules. Client devices 204a, 204b,-204n may be user devices such as mobile devices, tablets, a personal computers, terminals, kiosks, servers, server clusters, cloud services, storage devices, specialized devices configured to perform methods according to disclosed embodiments, or the like.

Client devices 204a, 204b,-204n may include interfaces configured to receive information from and/or provide information to a user and may be connected to displays, touch screens, keypads, speakers, microphones, sensors, scanners, mice, trackpads, cameras, buttons, dials, knobs, switches, haptic feedback devices, light emitting components, and other input and/or output devices. Client devices 204a, 204b,-204n may also include sensors, such as temperature sensors, light sensors, motion sensors, accelerometers, magnetometers, gyroscopes, temperature sensors, moisture sensors, and/or other types of sensors. Client devices 204a, 204b,-204n may further include components to connect to a network and/or another device, and a transceiver. Client devices 204a, 204b,-204n may be configured to connect to a network and/or another device via a wired connection, a short-range wireless connection, a BLUETOOTH connection, a WIFI connection, a radio connection, a near-field connection, or any other connection.

Sensor system 206 may include one or more sensors, including those described herein and/or any other sensors, and may be configured to manage sensor data (e.g., collect, store, retrieve, and/or share sensor data). Sensor system 206 may further include computing devices, computers, servers, server clusters, and/or cloud services, consistent with disclosed embodiments. Sensor system 206 may also include one or more memory units and one or more processors configured to perform operations consistent with disclosed embodiments and/or computing systems configured to generate, receive, retrieve, store, and/or provide data, consistent with disclosed embodiments.

Sensor system 206 may be configured to manage environmental data, climate data, and/or weather data, and may be further configured to manage data associated with one or more internet-of-things (IoT) devices. Sensor system 206 may also be configured to collect, store, retrieve, and/or transmit data based on an identifier and/or a data characteristic. For example, sensor system 206 may be configured to transmit data associated with a location, a time, a user, and/or the like.

Third-party system 208 may be configured to manage data (e.g., collect, store, retrieve, and/or share data, and may include a computing device, computers, servers, server clusters, and/or cloud services, consistent with disclosed embodiments. Third-party system 208 may further include one or more memory units and one or more processors configured to perform operations consistent with disclosed embodiments, as well as computing systems configured to generate, receive, retrieve, store, and/or provide data, consistent with disclosed embodiments.

In some embodiments, third-party system 208 may include websites, databases, sockets, subscription-based services, and/or other data provisioning services. For example, third-party system 208 may include weather reporting systems, location tracking systems, social media systems, messaging systems, and/or any other systems. As an illustrative example, third-party system 208 may be configured to provide weather data associated with a location (e.g., a national weather service report). Third-party system 208 may also be configured to provide transaction data, sleep data, health data, location data, climate data, and/or any other kind of data.

Database 210 may include one or more databases configured to store data for use by system 200, consistent with disclosed embodiments. In some embodiments, database may be configured to store data such as training data, environmental data, classification data, and/or other data, consistent with disclosed embodiments. Database 210 may include a cloud-based database (e.g., AMAZON WEB SERVICES RELATIONAL DATABASE SERVICE) or an on-premises database. Database 210 may include training data, model data (e.g., model parameters, training criteria, performance metrics, etc.), and/or other data, consistent with disclosed embodiments. Database 210 may include data received from one or more components of system 200 and/or computing components outside system 200 (e.g., via network 212). In some embodiments, database 210 may be a component of model-management system 202 (not shown).

At least one of model-management system 202, client devices 204a, 204b,-204n, sensor system 206, third-party system 208, and/or database 210 may be connected to network 212. Network 212 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 212 may be connected to other networks (not depicted in FIG. 2) to connect the various system components to each other and/or to external systems or devices. In some embodiments, network 212 may be a secure network and require a password to access the network.

Figure 1:
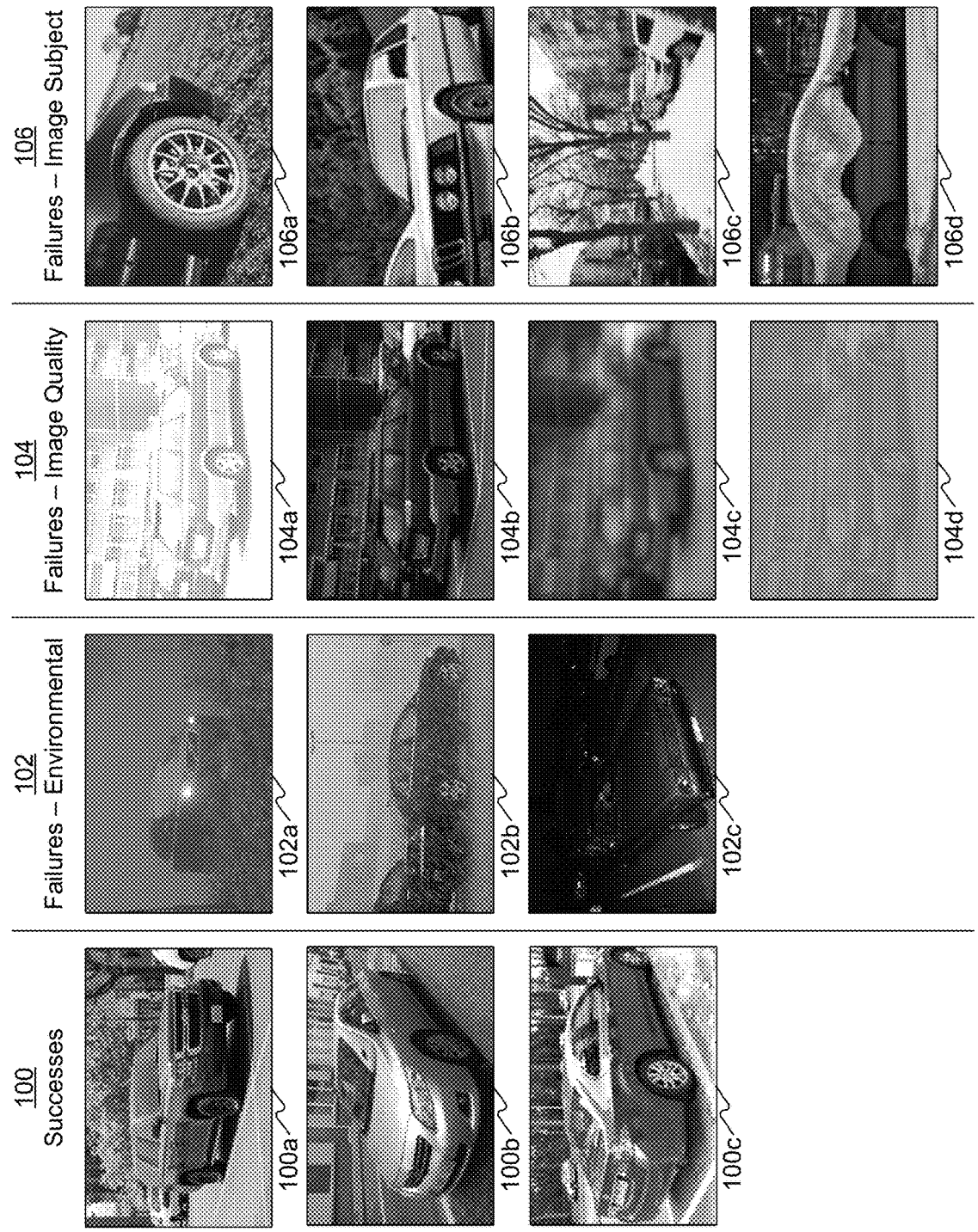
FIG. 1 illustrates results of an existing method for classifying data.

As previously described with respect to FIG. 1, a classification model may successfully classify images 100 but may fail to classify images 102, 104, and 106. A failure may arise from, for example, environmental factors, image quality factors, image subject factors, and/or other factors. Conventional systems may not have access to image data used to generate classification results. Consequently, conventional systems may be unable improve classification results.

Figure 3:
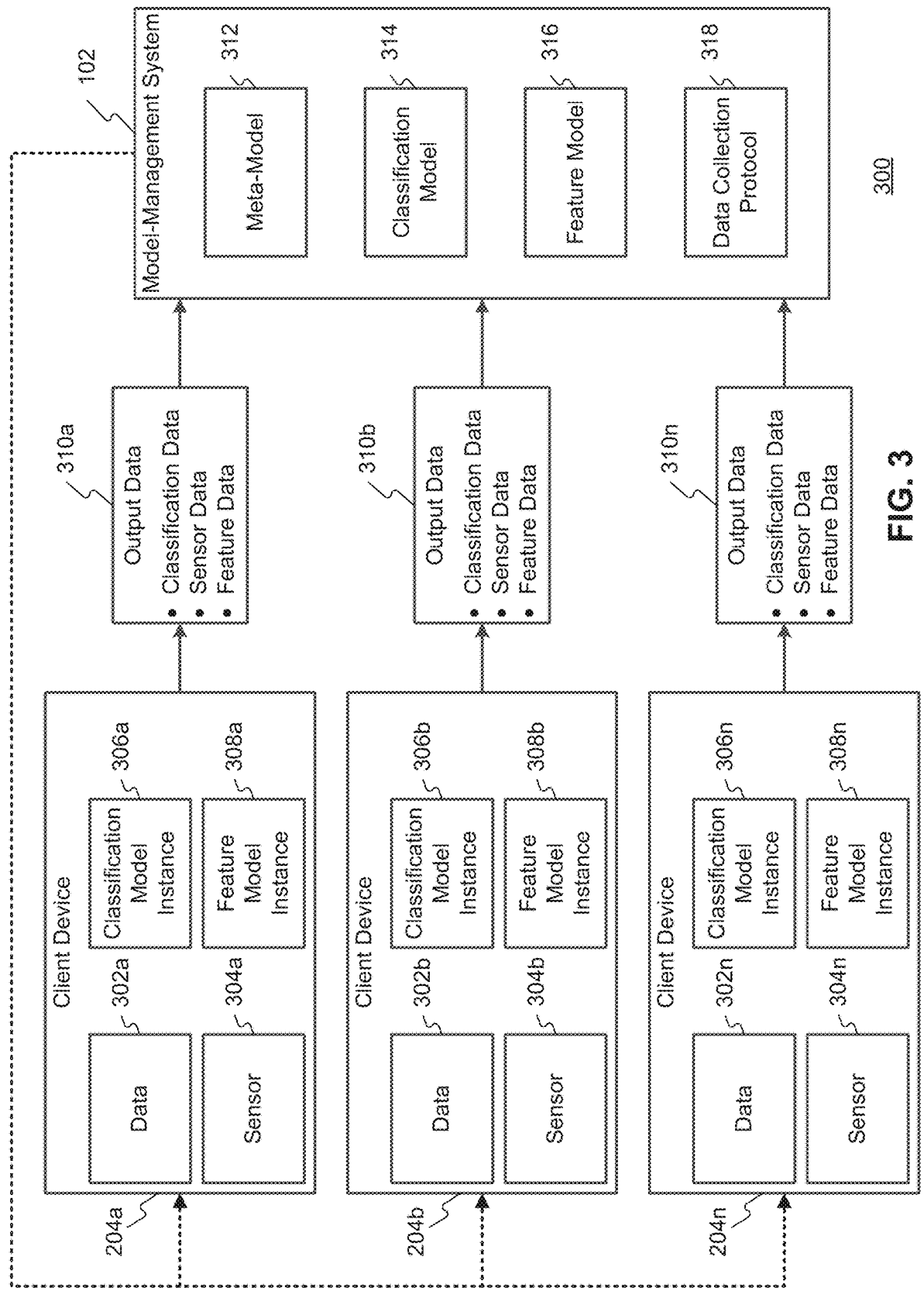
FIG. 3 illustrates an exemplary system for using a meta-model to improve data classification, consistent with disclosed embodiments.

FIG. 3 illustrates exemplary system 300 for using a meta-model to improve data classification, consistent with disclosed embodiments. As compared to conventional systems, system 300 may produce more accurate classification results with greater efficiency. As described in greater detail below, without access to data used to a generate classification result, a meta-model 312 may improve accuracy of a classification model by learning from data output of a classification model instance and a feature model instance. This may lead to more efficient training of a classification model. Accordingly, system 300 provides advantages by increasing accuracy, lowering costs, and reducing computing resource use.

System 300 may be an implementation of system 200. As shown, system 300 includes client devices 204a, 204b, -204n; output data 310a, 310b,-310n, and model-management system 202. FIG. 3 is shown for purposes of illustration only, and method 300 may include more or fewer client devices, output data, and/or model-management systems.

Client devices 204a, 204b, 204n may include a client device as described herein and/or any other client device; and may include data 302a, 302b,-302n, such as image data, text data, numeric data, video data, and/or any other type of data. In some embodiments, data 304a, 304b,-304n may be received via an interface of a client device (e.g., an input/output device), from network, from a local storage on a client device, from a database, from a sensor, and/or from any other computing component. Client device 204a, 204b,-204n may include sensors 304a, 304b,-304n, which may include sensors as described herein or any other sensor. Client devices 204a, 204b, 204n may be configured to collect data 302a, 302b,-302n based on one or more data collection protocols. Client devices may be configured to collect data 302a, 302b,-302n using sensors 304a, 304b,-304n. A client device may be configured to collect data using a sensor based on a data collection protocol.

Client devices 204a, 204b,-204n may include one or more classification model instances 306a, 306b,-306n (i.e., one or more classification models running and/or stored on a client device). Classification model instances 306a, 306b,-306n may include any type of classification model, consistent with disclosed embodiments. Classification model instances 306a, 306b,-306n may be instances of the same classification model and/or may be instances of different classification models from each other. In some embodiments, classification model instances 306a, 306b,-306n are trained and/or implemented locally on a client device to classify data 302a, 302b,-302n. For example, classification model instances 306a, 306b,-306n may be trained to classify a vehicle make, model, and year based on an image of a vehicle (e.g., using images such as those depicted in FIG. 2).

Client devices 204a, 204b,-204n may include one or more feature model instances 308a, 308b,-308n (i.e., one or more feature models running and/or stored on a client device). Feature model instances 308a, 308b,-308n may include any type of feature model, consistent with disclosed embodiments. Feature model instances 308a, 308b,-308n may be instances of the same feature model and/or may be instances of different feature models from each other. In some embodiments, feature model instances 308a, 308b,-308n are trained and/or implemented locally on a client device to identify features of data 302a, 302b,-302n. For example, feature model instances 308a, 308b,-308n may be configured to determine a statistical metric of data and/or machine-learned measure of data (e.g., neural network output based on input data). A statistical metric may include a univariate statistical metric, a multivariate statistical metric, an average, a median, a range, a correlation, a regression result, a goodness of fit, and/or any other statistical metric. For example, a feature model may be configured to generate a metric of image quality (e.g., a brightness metric, a blurriness metric, a contrast metric, or an environmental interference metric such as presence of rain or fog in an image) and/or determine a presence of an object in an image. A feature model may include a statistical model, an algorithm, and/or a machine learning model.

Output data 310a, 310b,-310n may be generated and/or transmitted by client devices 204a, 204b,-204n, respectively. Output data may include classification data, sensor data, and/or feature data. Classification data may include a classification model output and/or a classification result, consistent with disclosed embodiments. Feature data may include a feature model output. Feature model output may include a measure of a data feature, a statistical metric, an indicator of a presence of a detected-object, a metric associated with an image subject factors, and/or any other data based on a feature of a data sample, consistent with disclosed embodiments. Senor data may include temperature data, ambient light data, motion data, time data, location data, noise data, and/or any other sensor data. FIG. 3 is provided for purposes of illustration, and output data may include any other kind of data, including data not depicted in FIG. 3.

As shown, client devices 204a, 204b,-204n may transmit output data to model-management system 202. In some embodiments, client devices 204a, 204b,-204n may not transmit data used to classification model output due to a regulation, a privacy policy, a bandwidth limitation, or any other reason.

In some embodiments, model-management system 202 may include a meta-model 312, a classification model 314, a feature model 316, and/or a data-collection protocol 318. Consistent with disclosed embodiments, model-management system 202 may include other components not depicted in FIG. 3.

Meta-model 312 may be configured to generate an updated classification model 314 and/or data-collection protocol 318 based on output data 310a, 310b,-310n. Meta-model 312 may include a neural network model, a deep-learning model, a CNN model, a long short-term memory (LSTM) model, a random forest model, and/or any other machine learning model. In some embodiments, meta-model 312 includes a regression model, a linear regression model, a logistic regression model, a polynomial regression model, a multivariate model, a stochastic model, and/or any other statistical model.

Based on feature data, classification data, a data collection protocol, and/or additional data, meta-model 312 may determine that environmental conditions, image quality factors, image subject factors, and/or other factors lead to classification model failures. In some embodiments, meta-model 312 or other components of model-management system 202 may generate an updated classification model 314 and/or data-collection protocol 318 based on feature data. In some embodiments, feature data may include factors, and meta-model management system 202 may update classification model 314 based on factors associated with classification model failure. For example, model-management system 202 may train classification model 314 using training data that include factors that associated with classification model failure. As another example, model-management system 202 may include a check in a data collection protocol based on factors that are associated with classification model failure (e.g., an instruction to retake a photo based on an image contrast metric). Meta-model 312 may determine a statistical relationship and/or a machine-learned relationship between an aspect of a data collection protocol, feature data, sensor data, and/or classification data. Accordingly, without access to data used to generate classification results, meta-model 312 may be configured to improve accuracy of a classification model and/or change a data collection protocol to improve accuracy of classification results.

Classification model 314 may include any classification model described herein and/or any other classification model. In some embodiments, model-management system 202 is configured to train classification model 314 using training data. Model-management system 202 may be configured to transmit classification model 314 to a client device (e.g., in response to a request, as part of an application or program, etc.). In some embodiments, model-management system 202 may be configured to update classification model 314 based on meta-model output.

Feature model 314 may include any feature model described herein and/or any other feature model. In some embodiments, model-management system 202 is configured to train feature model 314 using training data. Model-management system 202 may be configured to transmit feature model 314 to a client device (e.g., in response to a request, as part of an application or program, etc.). In some embodiments, model-management system 202 may be configured to update feature model 314 based on meta-model output.

Model-management system 202 may include a data collection protocol 318. A data collection protocol may include a schedule, a rate, a frequency, a location, a quantity, data size, and/or any other data collection parameters. A data collection protocol may include a command to adjust a hardware setting, change a data collection parameter, wake a computing component, or the like. A data collection protocol may include a prompt for user input and may include commands to collect data based on received user input. A data collection protocol may include a data filter (i.e., a check) to reject or accept data. A filter may be based on a feature data. For example, a feature model output may determine a metric of data quality (e.g., blurriness metric) and include a filter to reject data based on a threshold. A data collection protocol may be part of an app or other program of a client device.

Figure 4:
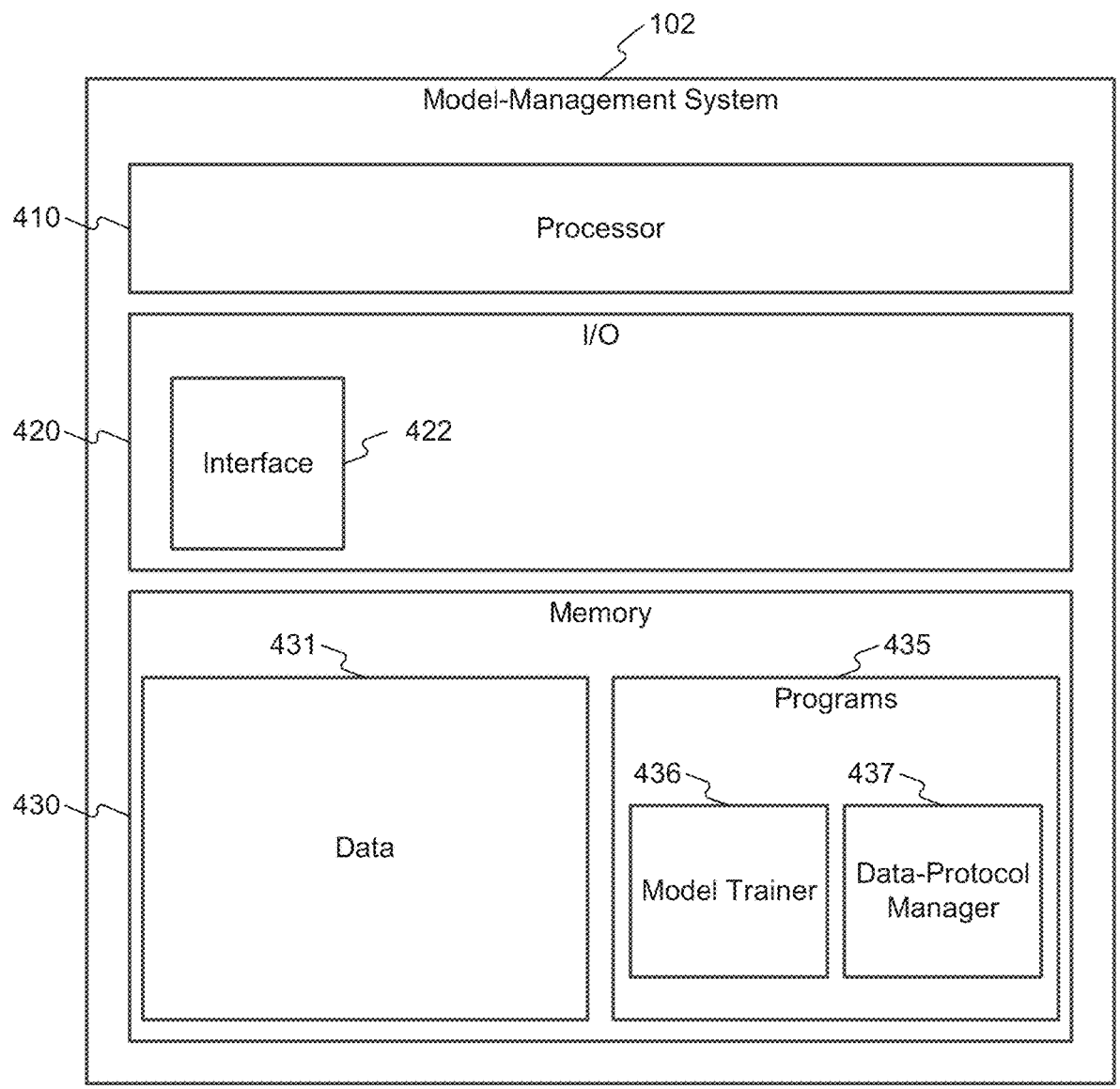
FIG. 4 is a block diagram of an exemplary model management system, consistent with disclosed embodiments.

FIG. 4 is a block diagram of exemplary model management system 202, consistent with disclosed embodiments. Model-management system 202 may include one or more computing devices, such as computers, servers, server clusters, and/or a cloud services, consistent with disclosed embodiments. As shown, model-management system 202 may include one or more processors 410, one or more I/O devices 420, and one or more memory units 430. In some embodiments, some or all components of model-management system 202 may be hosted on a computer, a server, a cluster of servers, or a cloud service. In some embodiments, model-management system 202 may be a scalable system configured to efficiently manage resources and enhance security by provisioning computing resources in response to triggering events and terminating resources after completing a task (e.g., a scalable cloud service that spins up and terminates container instances).

FIG. 4 depicts an exemplary configuration of model-management system 202. As will be appreciated by one skilled in the art, the components and arrangement of components included in model-management system 202 may vary. For example, as compared to the depiction in FIG. 4, model-management system 202 may include a larger or smaller number of processors, I/O devices, or memory units. In addition, model-management system 202 may further include other components or devices not depicted that perform or assist in the performance of one or more processes consistent with the disclosed embodiments. The components and arrangements shown in FIG. 4 are not intended to limit the disclosed embodiments, as the components used to implement the disclosed processes and features may vary.

Processor 410 may comprise known computing processors, including a microprocessor. Processor 410 may constitute a single-core or multiple-core processor that executes parallel processes simultaneously. For example, processor 410 may be a single-core processor configured with virtual processing technologies. In some embodiments, processor 410 may use logical processors to simultaneously execute and control multiple processes. Processor 410 may implement virtual machine technologies, or other known technologies to provide the ability to execute, control, run, manipulate, store, etc., multiple software processes, applications, programs, etc. In another embodiment, processor 410 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 410 may execute various instructions stored in memory 430 to perform various functions of the disclosed embodiments described in greater detail below. Processor 410 may be configured to execute functions written in one or more known programming languages.

I/O devices 420 may include at least one of a display, an LED, a router, a touchscreen, a keyboard, a microphone, a speaker, a haptic device, a camera, a button, a dial, a switch, a knob, a transceiver, an input device, an output device, or other I/O device to perform methods of the disclosed embodiments. I/O devices 420 may be components of an interface 422 (e.g., a user interface).

Interface 422 may be configured to manage interactions between system 200 and other systems using network 212. In some aspects, interface 422 may be configured to publish data received from other components of system 200. This data may be published in a publication and subscription framework (e.g., using APACHE KAFKA), through a network socket, in response to queries from other systems, or using other known methods. Data may be synthetic data, as described herein. As an additional example, interface 422 may be configured to provide information received from other components of system 200 regarding datasets. In various aspects, interface 422 may be configured to provide data or instructions received from other systems to components of system 200. For example, interface 422 may be configured to receive instructions for generating data models (e.g., type of data model, data model parameters, training data indicators, training parameters, or the like) from another system and provide this information to programs 435. As an additional example, interface 422 may be configured to receive data from another system (e.g., in a file, a message in a publication and subscription framework, a network socket, or the like) and provide that data to programs 435 or store that data in, for example, data 431, model storage 104, dataset database 206, and/or remote database 208.

In some embodiments, interface 422 may include a user interface configured to receive user inputs and provide data to a user (e.g., a data manager). For example, interface 422 may include a display, a microphone, a speaker, a keyboard, a mouse, a track pad, a button, a dial, a knob, a printer, a light, an LED, a haptic feedback device, a touchscreen and/or other input or output devices.

Memory 430 may be a volatile or non-volatile, magnetic, semiconductor, optical, removable, non-removable, or other type of storage device or tangible (i.e., non-transitory) computer-readable medium, consistent with disclosed embodiments. As shown, memory 430 may include data 431, including one of at least one of encrypted data or unencrypted data. Consistent with disclosed embodiments, data 431 may include datasets, model data (e.g., model parameters, training criteria, performance metrics, model output, classification result), and/or any other data.

Data 431 and/or programs 435 may include a classification model, consistent with disclosed embodiments. A classification model may include a neural network model, an attention network model, a GAN model, an RNN model, a deep learning model (e.g., an LSTM model), a random forest model, a CNN model (e.g., INCEPTION by GOOGLE), an RNN-CNN model, an LSTM-CNN model, a temporal-CNN model, a support vector machine (SVM) model, a gradient boosting machine (GBM) model, a logistic regression model, a multiclass logistic regression model, and/or any other machine-learning model.

Data 431 and/or programs 435 may include a feature model, consistent with disclosed embodiments. A feature model may include a statistical model, an algorithm, and/or a machine learning model. A feature model may include an object detection model, an edge detection model, a corner detection model, a scale-invariant feature transformation algorithm (SIFT), a histogram of oriented gradients algorithm (HOG), a neural network model, a recurrent neural network (RNN) model, a deep learning model (e.g., an LSTM model), a random forest model, a CNN model, an RNN-CNN model, an LSTM-CNN model, a support vector machine (SVM) model, a natural-language model, and/or any other machine-learning model. A feature model may be configured to extract any data feature For example, a feature model may be configured to extract color, texture, shape, motion, and location information from images (e.g., an "edginess" score reflecting a quantification of edge detection algorithms, or a "texturiness" score reflecting a quantification of an aspect of texture in an image). A feature model may be configured to determine a statistical metric of data and/or machine-learned measure of data. A statistical metric may include a univariate statistical metric, a multivariate statistical metric, an average, a median, a range, a correlation, a regression result, a goodness of fit, and/or any other statistical metric. For example, a feature model may be configured to generate a metric of image quality (e.g., brightness, blurriness, contrast, and/or an environmental interference measure such as presence of rain or fog in an image). A feature model may be configured to generate summary statistics or summary descriptions of extracted features (e.g., a 'texture' or 'edge' summary scaled from 0-1).

Data 431 and/or programs 435 may include a meta-model, consistent with disclosed embodiments. A meta-model may include a classification and/or regression-based meta model. A meta-model may include a neural network model, a deep-learning model, a CNN model, a long short-term memory (LSTM) model, a random forest model, a GBM model, and/or any other machine learning model. In some embodiments, meta-model 312 includes a regression model, a linear regression model, a logistic regression model, a multiclass logistic regression model, a polynomial regression model, a multivariate model, a stochastic model, and/or any other statistical model.

Programs 435 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 435 may be written in one or more programming or scripting languages. One or more of such software sections or modules of memory 430 may be integrated into a computer system, non-transitory computer-readable media, or existing communications software. Programs 435 may also be implemented or replicated as firmware or circuit logic.

Programs 435 may include a model trainer 436, a data-protocol manager 437, and/or other components (e.g., modules) not depicted to perform methods of the disclosed embodiments. In some embodiments, modules of programs 435 may be configured to spin up one or more ephemeral container instances to perform a task and/or to assign a task to a running (warm) container instance, consistent with disclosed embodiments. Modules of programs 435 may be configured to receive, retrieve, and/or generate models, consistent with disclosed embodiments. Modules of programs 435 may be configured to perform operations in coordination with one another. In some embodiments, programs 435 may be configured to conduct an authentication process, consistent with disclosed embodiments.

Model trainer 436 may include algorithms to optimize machine learning models. Model trainer 436 may include programs for optimizing parameters based on an objective function, such as a loss function, or other methods of optimizing model parameters. Model trainer 436 may be configured to perform hyperparameter tuning. In some embodiments, machine-learning models may include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a natural-language model, and/or any other machine-learning model. Models may include an ensemble model (i.e., a model comprised of a plurality of models). Model trainer 436 may be configured to generate and/or train a classification model, consistent with disclosed embodiments. Model trainer 436 may be configured to generate and/or train a feature model, consistent with disclosed embodiments. Model trainer 436 may be configured to generate and/or train a meta-model, consistent with disclosed embodiments.

In some embodiments, training of a model may terminate when a training criterion is satisfied. A training criterion may include a number of epochs, a training time, a performance metric (e.g., an estimate of accuracy in reproducing test data, a loss function metric), or the like. Model trainer 436 may be configured to adjust model parameters during training. Model parameters may include weights, coefficients, offsets, or the like. Training may be supervised or unsupervised.

Data-protocol manager 437 may include algorithms to manage data collection protocols, such as data collection protocols used to collect data to generate classification results. Data-protocol manager 437 may include programs to generate and/or update applications or other package (e.g., programs to generate and/or compile executable code). Data-protocol manager 437 may include programs for determining relationships between a data collection protocol and a classification result. Consistent with disclosed embodiments, data-protocol manager 437 may include models such as machine learning models and/or statistical models. Data-protocol manager 437 may be configured to generate and/or update a data collection protocol based on device type (e.g., data-collection protocols based on a smartphone device type, a tablet device type, a computer device type, etc.).

Figure 5:
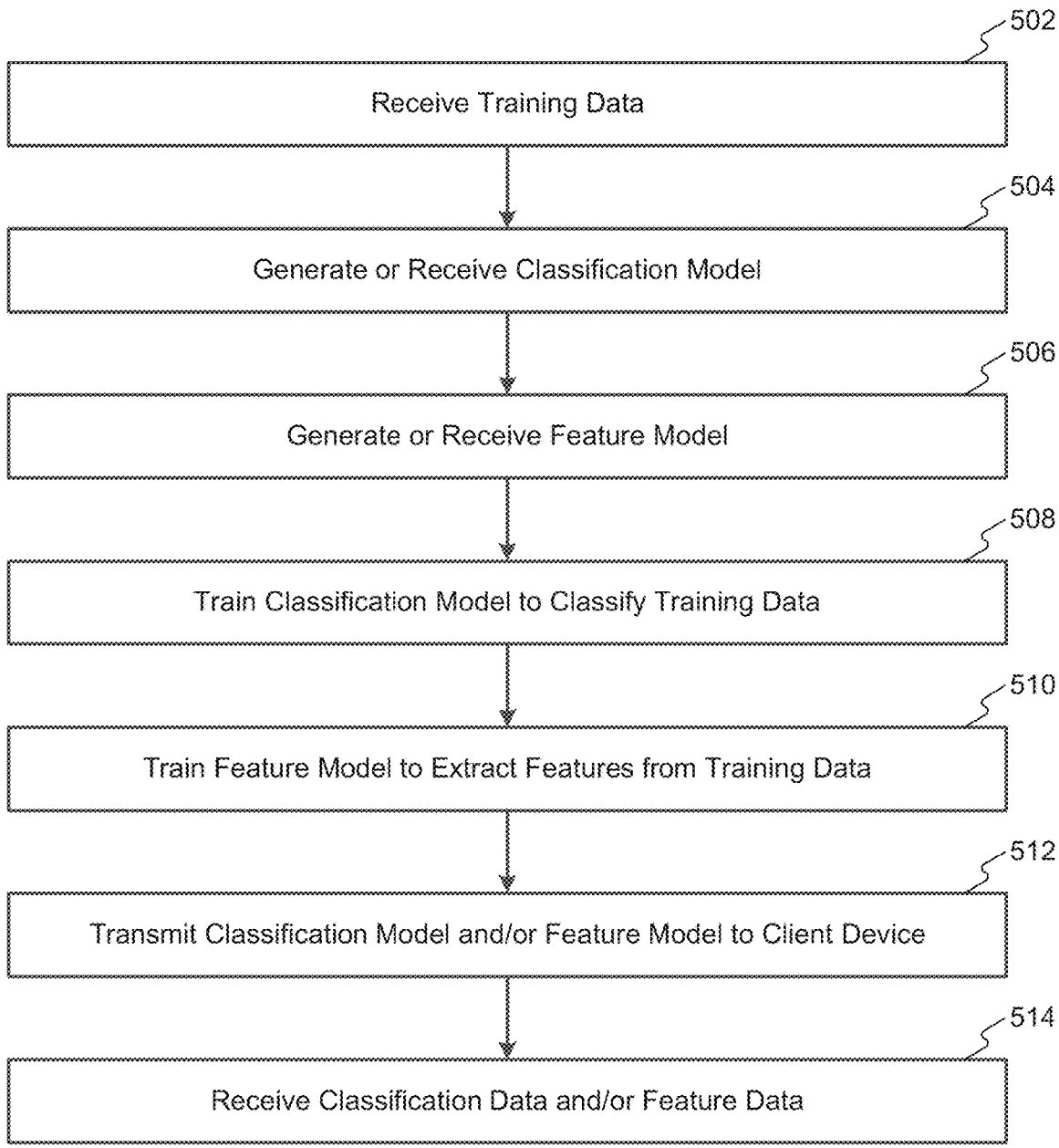
FIG. 5 is a flow chart of an exemplary process for training a classification model and/or a feature model, consistent with disclosed embodiments.

FIG. 5 is a flow chart of exemplary process 500 for training a classification model and/or a feature model, consistent with disclosed embodiments. In some embodiments, model-management system 202 may perform process 500 using programs 435 (FIG. 4). One or more of model trainer 436, data-protocol manager 437, and/or other components of programs 435 (FIG. 4) may perform operations of process 500, consistent with disclosed embodiments. It should be noted that other components of system 200 (FIG. 2), including, for example, one or more of client devices 204*a*, 204*b*,-204*n* may perform operations of one or more steps of process 500.

Consistent with disclosed embodiments, steps of process 500 may be performed on one or more cloud services using one or more ephemeral container instances. For example, at any of the steps of process 500, model-management system 202 may generate (spin up) an ephemeral container instance to execute a task, assign a task to an already-running ephemeral container instance ("warm" container instance), or terminate a container instance upon completion of a task. As one of skill in the art will appreciate, steps of process 500 may be performed as part of an application interface (API) call.

At step 502, model-management system 202 may receive training data, consistent with disclosed embodiments. Model-management system 202 may receive training data from a component of system 200 and/or any other computing component. Model-management system 202 may retrieve training data from a data storage (e.g., data 431). Training data at step 502 may include any type of data as described herein and/or any other data. Training data may include, for example, image data, string data, numeric data, or other data. Training data may include labels, classification data, cluster data, meta-data or the like. In some embodiments, training data may include images of vehicles and corresponding labels that may include a make, model, and/or year of a vehicle.

At step 504, model-management system 202 may generate or receive a classification model, consistent with disclosed embodiments. A classification model may include any classification model described herein and/or any other classification model. In some embodiments, generating a classification model includes generating seeds for model parameters. In some embodiments, generating a classification model includes receiving a classification model from a data storage and/or another computing component (e.g., data 231, client device 204*n*, third-party system 208, database 210).

At step 506, model-management system 202 may generate or receive a feature model, consistent with disclosed embodiments. A feature model may include any feature model described herein and/or any other feature model. In some embodiments, generating a feature model includes generating seeds for model parameters. In some embodiments, generating a feature model includes receiving a feature model from a data storage and/or another computing component (e.g., data 431, client device 204*n*, third-party system 208, database 210).

At step 508, model-management system 202 may train a classification model to classify training data, consistent with disclosed embodiments. Training at step 508 may include using training data and may include any method of training as described herein and/or any other method of training a machine learning model.

At step 510, model-management system 202 may train a feature model to extract features from training data, consistent with disclosed embodiments. Training at step 510 may include using training data and may include any method of training as described herein and/or any other method of training a machine learning model.

At step 512, model-management system 202 may transmit a classification model and/or a feature model to a client device, consistent with disclosed embodiments. A client device may include client device 204*a*, 204*b*,-204*n*.

At step 514, model-management system 202 may receive classification data and/or feature data, consistent with disclosed embodiments. Step 514 may include receiving classification data and/or feature data from a client device, consistent with disclosed embodiments.

Figure 6:
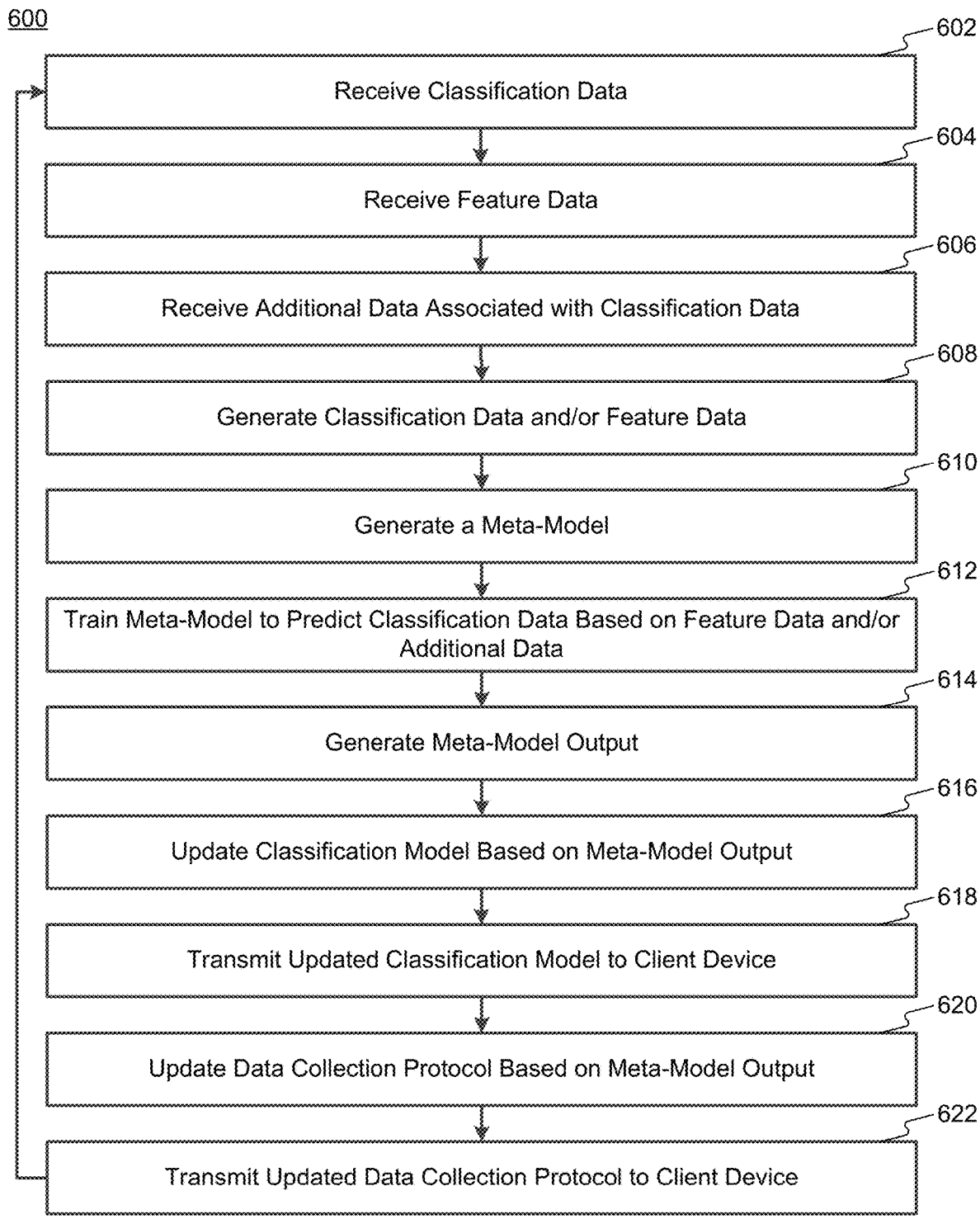
FIG. 6 is a flow chart of an exemplary process for updating a classification model and/or data collection protocol, consistent with disclosed embodiments.

FIG. 6 is a flow chart of exemplary process 600 for updating a classification model and/or data collection protocol, consistent with disclosed embodiments. In some embodiments, model-management system 202 may perform process 600 using programs 435. One or more of model trainer 436, data-protocol manager 437, and/or other components of programs 435 may perform operations of process 600, consistent with disclosed embodiments. It should be noted that other components of system 200, including, for example, one or more of client devices 204a, 204b,-204n may perform operations of one or more steps of process 600.

Consistent with disclosed embodiments, steps of process 600 may be performed on one or more cloud services using one or more ephemeral container instances. For example, at any of the steps of process 600, model-management system 202 may spin up an ephemeral container instance to execute a task, assign a task to an already-running ephemeral container instance (warm container instance), or terminate a container instance upon completion of a task. As one of skill in the art will appreciate, steps of process 600 may be performed as part of an application interface (API) call.

At step 602, model-management system 202 may receive classification data, consistent with disclosed embodiments. Classification data may include a classification model output and/or a classification result. A classification model output may include any classification model output described herein and/or any other classification model output. A classification result may include any classification result described herein and/or any other classification result. Classification data may be received from one or more client devices (e.g., client device 204a, 204b,-204n). Classification data may be received from any other computing component (e.g., data 431, database 210).

At step 604, model-management system 202 may receive a feature data, consistent with disclosed embodiments. Feature data may include feature model output, consistent with disclosed embodiments. A feature model output may include any feature model output described herein and/or any other feature model output. Feature model output may be received from one or more client devices (e.g., client device 204a, 204b,-204n). Feature model output may be received from any other computing component (e.g., data 431, database 210).

At step 606, model-management system 202 may receive additional data associated with classification data, consistent with disclosed embodiments. Additional data may be received from third-party system 208, sensor system 206, one or more client devices (client devices 204a, 204b,-204n) and/or any other computing component (e.g., data 431, database 210). Additional data may include any data as described herein and/or any other data. Additional data may include location data, time data, environmental data, climate data, weather data, sensor data, and/or any other data associated with classification data. For example, additional data may include location data and weather data associated with a photo used to generate a classification result of a classification model output. In some embodiments, step 606 includes processing additional data (e.g., generating summary statistics of additional data).

At step 610, model-management system 202 may generate classification data and feature data, consistent with disclosed embodiments.

In some embodiments, generating classification data at step 610 includes generating additional classification data based on classification data received at step 602. For example, model-management system 202 may generate a classification result. In some embodiments, step 610 includes generating a classification result such as an indicator of a classification model success or failure (e.g., a classification result based on a threshold and a classification model output). Classification data generated at step 610 may include any classification data as described herein and/or any other classification data.

In some embodiments, generating feature data at step 610 may include generating additional feature data based on feature data received at step 604. For example, generating feature data may include determining whether feature data received at step 604 meets a criterion (e.g., is above or below a threshold). Generating feature data may include generating statistical metrics of feature data received at step 604.

At step 610, model-management system 202 may generate a meta-model, consistent with disclosed embodiments. In some embodiments, generating a meta-model includes generating seeds for model parameters. In some embodiments, generating a meta-model includes receiving a meta-model from a data storage and/or another computing component (e.g., data 431, client device 204n, third-party system 208, database 210). A meta-model may include any meta-model, consistent with disclosed embodiments.

At step 612, model-management system 202 may train a meta-model to predict classification data based on feature data and/or additional data, consistent with disclosed embodiments. Classification data used at step 612 may include any classification data (e.g., classification data received at step 602 and/or classification data generated at step 608). Feature data used at step 612 may include any feature data (e.g., feature data received at step 604 and/or feature data generated at step 608). Additional data used at step 612 may include received additional data and/or the results of data processing of additional data. Training at step 612 may include using training data. Training at step 612 may include any method of training as described herein and/or any other method of training a machine learning model.

At step 614, model-management system 202 may generate meta-model output based on classification data, feature data, and/or additional data, consistent with disclosed embodiments. Classification data used at step 612 may include any classification data (e.g., classification data received at step 602 and/or classification data generated at step 608). Meta-model output may include a metric of a relationship (e.g., a metric of a statistical relationship, a metric of a machine-learned relationship such as a score, a weight, an activation function value, or the like), a classification result, cluster data, meta-data, a label, a statistical metric, a feature model-output, data related to a data-collection protocol, and/or any other meta-model output. In some embodiments, meta-model output may include a measure of a relationship between an aspect of a data collection protocol and a classification result (e.g., a statistical relationship, a machine-learned relationship). In some embodiments, meta-model output may include a measure of a relationship between a feature model output and a classification result (e.g., a statistical relationship, a machine-learned relationship). For example, meta-model output may include a correlation between a feature model output comprising an image quality metric and a success or failure indicator of a classification result.

At step 616, model-management system 202 may update a classification model based on meta-model output, consistent with disclosed embodiments. In some embodiments, updating a classification model includes training a classification model, consistent with disclosed embodiments. Training may be supervised or unsupervised. In some embodiments, updating a classification model at step 616 includes performing steps of process 500. In some embodiments, model-management system 202 may update a classification model by generating an application or other package comprising an updated classification model. In some embodiments, updating a classification model may include displaying a request for user input at an interface (e.g., interface 422) and/or a device connected to model-management system 202, the request being based on meta-model output. Updating a classification model may include receiving user input via an interface (e.g., interface 422) and updating a classification model based on the received user input.

In some embodiments, updating a classification model includes identifying training data and using identified training data to train a classification model. Identifying training data may be based on a feature model output and/or a meta-model output. Identifying training data may include identifying training data that satisfies a criterion based on a feature model output (e.g., based on an image quality metric). For example, model-management system 202 may identify training data with a blurriness metric above or below a threshold. Identifying training data may be based on additional data received at step 606. For example, identifying training data may include identifying data based on location data, time data, environmental data, climate data, weather data, sensor data, and/or other data.

At step 618, model-management system 202 may transmit an updated classification model to a client device (e.g., one or more of client devices 204a, 204b,-204n), consistent with disclosed embodiments. In some embodiments, transmitting an updated classification model may include transmitting an application or other package comprising an updated classification model. In some embodiments, transmitting an updated classification model may include transmitting model parameters and/or instructions to update a classification model instance on a client device.

At step 620, model-management system 202 may update a data collection protocol based on meta-model output, consistent with disclosed embodiments. In some embodiments, updating a data collection protocol may be based on meta-model output comprising a metric of a relationship between feature data, an aspect of a data collection protocol, additional data received at step 606, and/or classification data. As an example, meta-model output may include a determination that a classification result is more likely to be a failure if an image quality criteria is not satisfied and/or a sensor indicates a level of light below a threshold, and updating a data collection protocol may include adding a data quality check based on the image quality criteria and a level of light to a data collection protocol. For example, updating a data collection protocol may include generating an instruction to reject an image if an image quality check criterion and/or a level of light criterion are not satisfied. Updating a data collection protocol may include generating an instruction to collect a second data sample based whether a first data sample satisfies a criterion (e.g., generating an instruction to retake a photo based on a criterion may include an image quality factor, an environmental factor, and/or an image subject factor).

In some embodiments, updating a data collection protocol may include specifying a schedule, a rate, a frequency, a location, a quantity, data size, and/or any other data collection parameter. In some embodiments, updating a data collection protocol may include generating a command to adjust a hardware setting, change a data collection parameter, wake a computing component, or the like. Updating a data collection protocol may include generating instructions (e.g., code) to create a request for user input (i.e., a prompt) and/or code to generate commands for collecting data based on received user input. In some embodiments, updating a data collection protocol may include generating a data filter (i.e., a check) to reject or accept data. A filter may be based on a feature model output and/or additional data received at step 606. For example, a feature model output may determine a metric of data quality (e.g., blurriness metric) and include a filter to reject data based on a threshold. A data collection protocol may be part of an app or other program of a client device.

In some embodiments, model-management system 202 may update a data collection protocol by generating an application or other package comprising an updated data collection protocol. In some embodiments, updating a data collection protocol may include displaying a request for user input at an interface (e.g., interface 422) and/or a device connected to model-management system 202, the request being based on meta-model output. Updating a data collection protocol may include receiving user input via an interface (e.g., interface 422) and updating a data collection protocol based on the received user input.

At step 622, model-management system 202 may transmit an updated data collection protocol to a client device, consistent with disclosed embodiments. In some embodiments, transmitting an updated data collection protocol may include transmitting an application or other package comprising an updated data collection protocol. In some embodiments, transmitting an updated data collection protocol may include transmitting instructions to update a data collection protocol on a client device.

As shown in FIG. 6, model-management system 202 may repeat one or more of steps 602 to 622, consistent with disclosed embodiments. In some embodiments, process 600 is performed iteratively to improve performance of a classification model on one or more client devices and/or improve a data collection protocol on one or more client devices.

Figure 7:
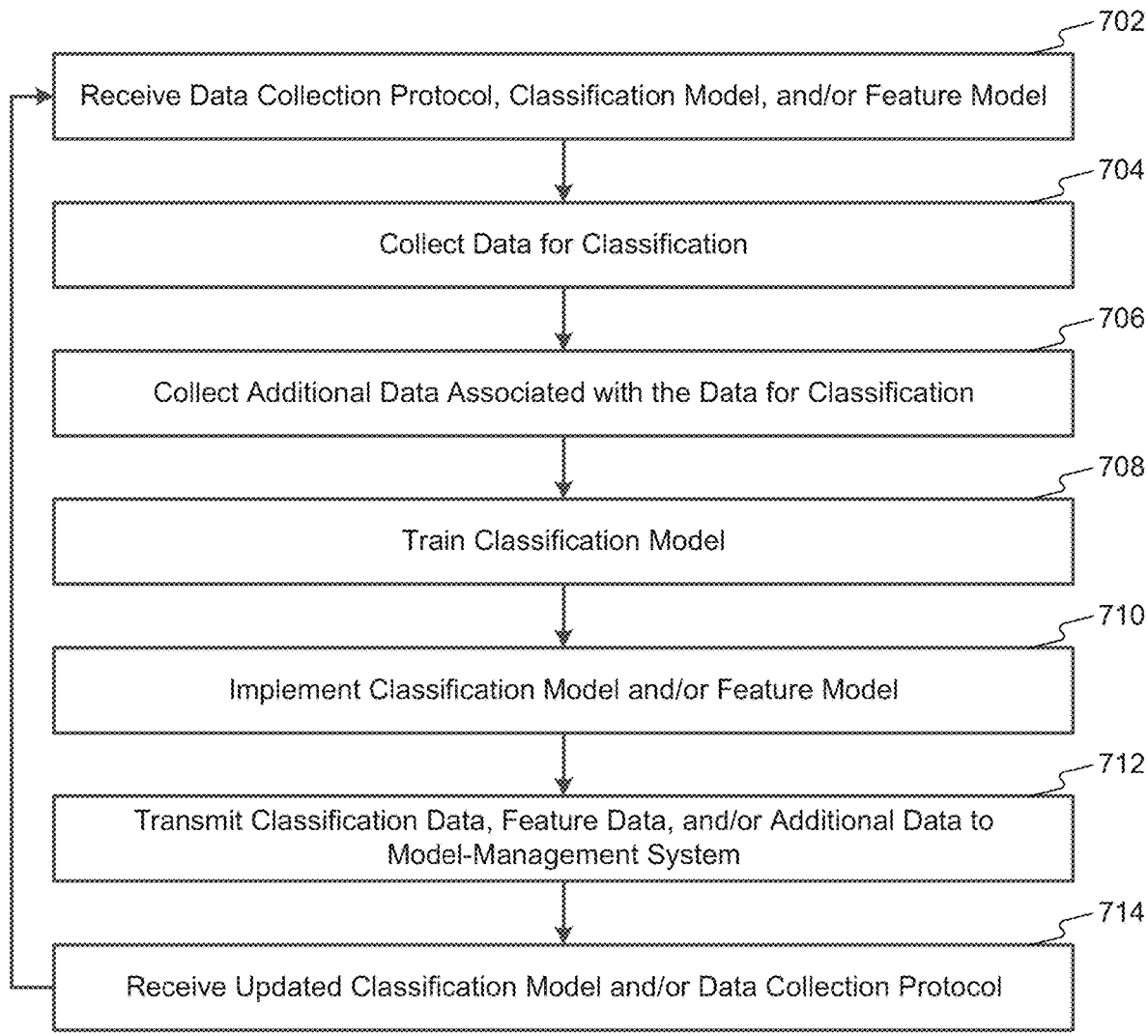
FIG. 7 is a flow chart of an exemplary process for implementing a data collection protocol and updating a classification model and/or data collection protocol, consistent with disclosed embodiments.

FIG. 7 is a flow chart of exemplary process 700 for implementing a data collection protocol and updating a classification model and/or data collection protocol, consistent with disclosed embodiments. In some embodiments, one or more of client devices 204a, 204b,-204n may perform process 700 using programs 435. One or more of model trainer 436, data-protocol manager 437, and/or other components of programs 435 may perform operations of process 700, consistent with disclosed embodiments. It should be noted that other components of system 200, including, for example, model-management system 202 may perform operations of one or more steps of process 700.

Consistent with disclosed embodiments, steps of process 700 may be performed on one or more cloud services using one or more ephemeral container instances. For example, at any of the steps of process 700, model-management system 202 may spin up an ephemeral container instance to execute a task, assign a task to an already-running ephemeral container instance, or terminate a container instance upon completion of a task. As one of skill in the art will appreciate, steps of process 700 may be performed as part of an application interface (API) call.

At step 702, a client device (e.g., client device 204a, 204b,-204n) may receive a data collection protocol, a classification model, and/or a feature model, consistent with disclosed embodiments. In some embodiments, step 702 includes receiving a data collection protocol, a classification model, and/or a feature model from model-management system 202 and/or another computing component (e.g., a component of system 200).

At step 704, a client device (e.g., client device 204a, 204b,-204n) may collect data for classification, consistent with disclosed embodiments. Collecting data for classification may include collecting data using a sensor, a camera, a microphone, an interface, and/or any other component of a client device (e.g., client device 204a, 204b,-204n). In some embodiments, collecting data for classification includes receiving data from another computing component (e.g., a component of system 200). For example, collecting data for classification may comprise capturing an image of an object such as a vehicle.

At step 706, a client device (e.g., client device 204a, 204b,-204n) may collection additional data associated with the data for classification, consistent with disclosed embodiments. Collecting additional data may include collecting data using a sensor, a camera, a microphone, an interface, and/or any other component of a client device (e.g., client device 204a, 204b,-204n). In some embodiments, collecting additional includes receiving data from another computing component (e.g., a component of system 200). For example, collecting additional may comprise collecting time data, location data, sensor data, motion data, weather data, climate data, light data, noise data, and/or any other data associated with data collection for classification. For example, collecting additional data may include collecting ambient light data and motion data corresponding to an image captured for classification.

At step 708, a client device (e.g., client device 204a, 204b,-204n) may train a classification model, consistent with disclosed embodiments. Training a classification model may include any method of training a machine learning model, consistent with disclosed embodiments. For example, a client device may conduct a supervised training of an image classification model based on user inputs.

At step 710, a client device (e.g., client device 204a, 204b,-204n) may implement a classification model and/or a feature model, consistent with disclosed embodiments. In some embodiments, implementing a classification model includes classifying a data sample by generating a classification model output (e.g., classifying a sample of data collected at step 704). In some embodiments, implementing a feature model includes generating a feature model output based on a data sample. Step 710 may include generating classification data based on classification model output. For example, a client device may generate a classification result based on classification model output. In some embodiments, classification model output includes a classification result. Step 710 may include generating feature data based on feature model output. In some embodiments, generating feature data includes analyzing or processing feature model output (e.g., generating statistical metrics of feature model output). Feature data may include feature model output.

At step 712, a client device (e.g., client device 204a, 204b,-204n) may transmit classification data, feature data, and/or additional data associated with the data for classification to model-management system 202, consistent with disclosed embodiments.

At step 714, a client device (e.g., client device 204a, 204b,-204n) may receive an updated classification model and/or data collection protocol, consistent with disclosed embodiments. In some embodiments, step 714 includes receiving a data collection protocol, a classification model, and/or a feature model from model-management system 202 and/or another computing component (e.g., a component of system 200).

As shown in FIG. 7, a client device (e.g., client device 204a, 204b,-204n) may repeat one or more of steps 702 to 714, consistent with disclosed embodiments. In some embodiments, process 700 is performed iteratively to improve performance of a classification model on one or more client devices and/or a data collection protocol on one or more client devices.

Figure 8:
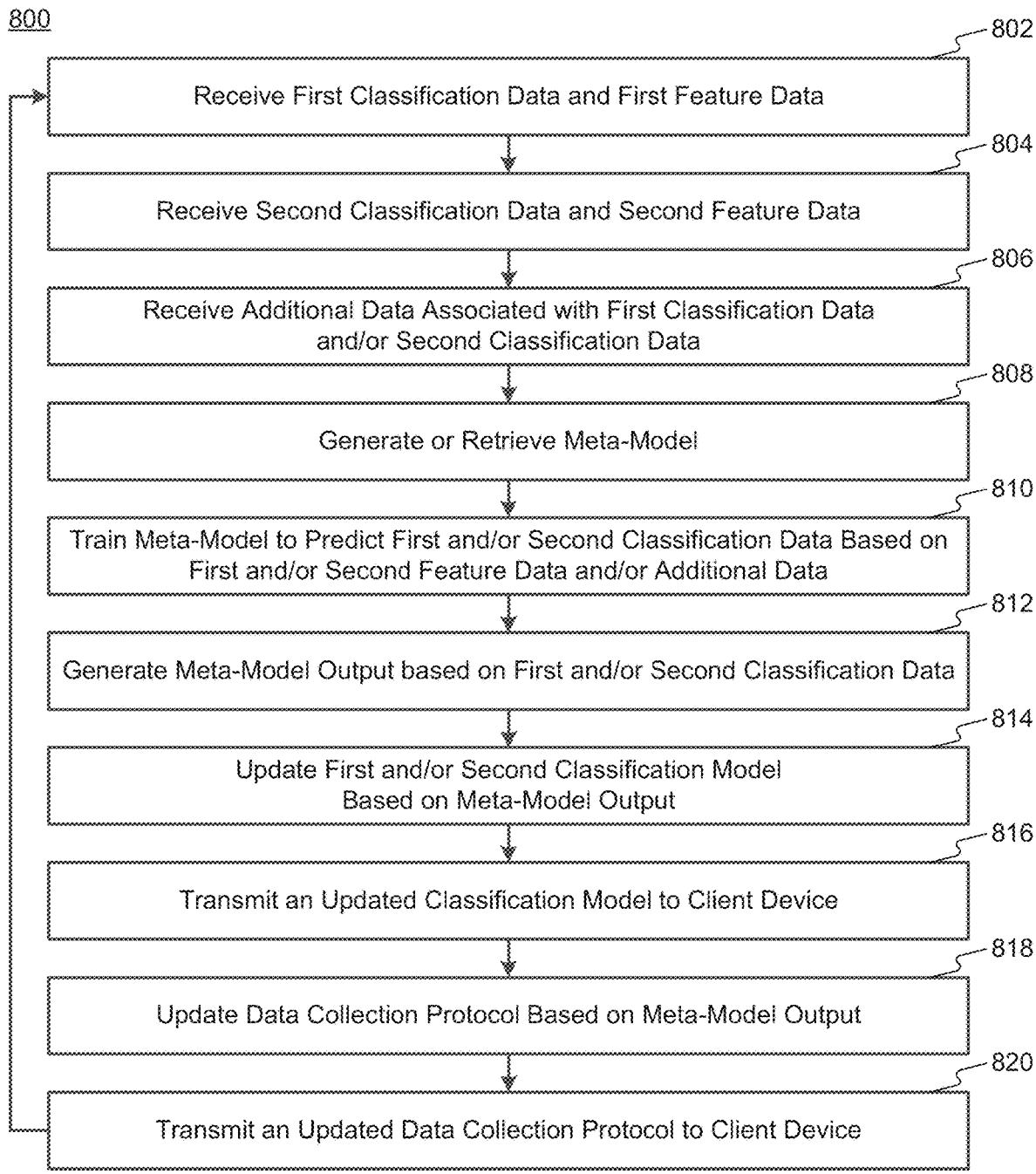
FIG. 8 is a flow chart of an exemplary process for updating a classification model and/or data collection protocol, consistent with disclosed embodiments.

FIG. 8 is a flow chart of an exemplary process 800 for updating a classification model and/or data collection protocol, consistent with disclosed embodiments. Process 800 may be performed to compare classification models, feature models, and/or data collection protocols. For example, process 800 may be performed to compare different classification models running on one or more client devices, servers, cloud service and/or other computing components. Process 800 may be performed to improve classification model performance by updating a classification model, a feature model, and/or a data collection protocol.

In some embodiments, model-management system 202 may perform process 800 using programs 435. One or more of model trainer 436, data-protocol manager 437, and/or other components of programs 435 may perform operations of process 800, consistent with disclosed embodiments. It should be noted that other components of system 200, including, for example, one or more of client devices 204a, 204b,-204n may perform operations of one or more steps of process 800.

Consistent with disclosed embodiments, steps of process 800 may be performed on one or more cloud services using one or more ephemeral container instances. For example, at any of the steps of process 800, model-management system 202 may spin up an ephemeral container instance to execute a task, assign a task to an already-running ephemeral container instance (warm container instance), or terminate a container instance upon completion of a task. As one of skill in the art will appreciate, steps of process 800 may be performed as part of an application interface (API) call.

At step 802, model-management system 202 may receive first classification data and first feature data from a first client device (e.g., client device 204a, 204b,-204n) and/or another computing component (e.g., programs 435), consistent with disclosed embodiments. A first classification data may be based on first classification model output, which may be generated by a first classification model. First feature data may be based on a first feature model output, which may be generated by a first feature model. Step 802 may include receiving information relating to a first data collection protocol used to collect data classified in a first classification model output.

At step 804, model-management system 202 may receive second classification data and second feature data, consistent with disclosed embodiments. In some embodiments, model-management system 202 may receive second classification data and second feature data from the first client device (step 802) and/or a second client device (e.g., client device 204a, 204b,-204n). A second client device may be different from a first client device.

Second classification data may be associated with a second classification model (e.g., second classification data may be based on output of a second classification). A second classification model may be the same as or different from a first classification model of step 802. For example, a first and second classification model may include different model types, may include different instances of the same model, and/or may be trained on different training data, etc. Step 804 may include receiving information relating to a second data collection protocol used to collect data classified in a second classification model output. A second data collection protocol may be the same as or different from a first data collection protocol of step 802.

Second feature data may be associated with a second feature model (e.g., second classification data may be based on output of a second feature model). A second feature model may be different from a first feature model of step 802. For example, a first and second feature model may be different model types, may be different instances of the same model, and/or may be trained on different training data, etc.

At step 806, model-management system 202 may receive additional data associated with a first classification model and/or a second classification model, consistent with disclosed embodiments. Additional data at step 802 may include any of the additional data described herein and/or any other data. Step 806 may include receiving additional data from a first client device, a second client device, and/or another computing component (e.g., a component of system 200).

At step 808, model-management system 202 may generate a meta-model, consistent with disclosed embodiments. Generating a meta-model may include any method of generating a meta-model, including receiving or retrieving a meta-model, consistent with disclosed embodiments.

At step 810, model-management system 202 may train a meta-model to predict first and/or second classification data based on first and/or second feature data and/or additional data, consistent with disclosed embodiments. Training at step 810 may include any method of training described herein (e.g., step 616) and/or any other method of training.

At step 812, model-management system 202 may generate a meta-model output based on first and/or second classification data, consistent with disclosed embodiments. Meta-model output may include any type of meta-model output as described herein (e.g., in reference to step 614). Meta-model output at step 812 may include a result of a comparison between first classification data and second classification data (e.g., a statistical metric, a score indicating a difference between first classification model performance and second classification model performance).

In some embodiments, a meta-model output at step 812 may include a first measure of a relationship between first feature data and first classification data (e.g., a statistical relationship, a machine-learned relationship). In some embodiments, a meta-model output at step 812 may include a second measure of a relationship between second feature data and second classification data (e.g., a statistical relationship, a machine-learned relationship). In some embodiments, a meta-model output at step 812 may include a result of a comparison of a first measure to a second measure. For example, a meta-model output may include an indication of a comparative goodness of fit, a comparative score, etc., between a first and second measure.

At step 814, model-management system 202 may update a first and/or second classification model based on a meta-model output, consistent with disclosed embodiments. In some embodiments, updating a classification model at step 814 includes performing steps of process 500 and/or process 600 (e.g., step 616). Updating a classification model may be based on a meta-model output indicating a difference between a first classification model performance and a second classification model performance. For example, a meta-model output may indicate that a second classification model has a higher rate of successful image classification for images with a low image contrast metric than a first classification model, and updating a classification model may include training the first classification model using images with low image contrast metrics.

At step 816, model-management system 202 may transmit an updated classification model to a client device, consistent with disclosed embodiments. In some embodiments, transmitting an updated classification model may include transmitting an application or other package comprising an updated classification model. In some embodiments, transmitting an updated classification model may include transmitting model parameters and/or instructions to update a classification model instance on a client device.

At step 818, model-management system 202 may update a data collection protocol based on a meta-model output, consistent with disclosed embodiments. In some embodiments, updating a classification model at step 814 includes performing steps of process 500 and/or process 600 (e.g., step 616). Updating a data collection protocol may be based on a meta-model output indicating a difference between a first classification model performance and a second classification model performance. For example, a meta-model output may indicate that one classification model has a higher rate of successful image classification when classifying data using a data collection protocol that includes a data quality check for low image contrast, and updating a classification model may include updating a data collection protocol to include a data quality check for low image contrast.

At step 820, model-management system 202 may transmit an updated data collection protocol to a client device, consistent with disclosed embodiments. In some embodiments, transmitting an updated data collection protocol may include transmitting an application or other package comprising an updated data collection protocol. In some embodiments, transmitting an updated data collection protocol may include transmitting instructions to update a data collection protocol on a client device.

As shown in FIG. 8, model-management system 202 may repeat one or more of steps 802 to 820, consistent with disclosed embodiments. In some embodiments, process 800 is performed iteratively to improve performance of a classification model on one or more client devices and/or a data collection protocol on one or more client devices.

Systems and methods disclosed herein involve unconventional improvements over conventional approaches to synthetic data generation. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for improving classification results, comprising:
  one or more memory units storing instructions; and
  one or more processors configured to execute the instructions to perform operations comprising:
    receiving classification data from a first client device having a classification model and a feature model configured to extract a first data feature from a first data sample, the classification data comprising:
      a classification result of the first data sample, the classification result generated by the classification model and in response to user input at the first client device; and
      a level of confidence that the classification result is accurate;
    receiving, from the first client device, first feature data corresponding to the classification data, the first feature data comprising:
      the first data feature extracted from the first data sample by the feature model;
      a data quality metric of the first data feature describing the first data sample, wherein the data quality metric comprises a metric of image quality, a brightness metric, a blurriness metric, a contrast metric, or a metric associated with an image subject factor;
    training a meta-model at a device distinct from the first client device to predict a classification result based on the classification data received from the first client device and the data quality metric;
    processing the first data feature and the data quality metric, using the trained meta-model, to generate a meta-model output comprising a reason for failures of the classification result caused by metrics relating to image quality, brightness, blurriness, contrast, or image subject factors;
    determining, based on the reason for failures of the classification result as found in the meta-model output, a factor that led to a failure of the classification model;
    generating a data collection protocol based on the factor that led to the failure of the classification model;
    updating the classification model based on a user input received at the device separate from the first client device, the meta-model output, the data collection protocol, and the determined factor, the updated classification model being configured to classify a second data sample based on a second feature data of the second data sample; and
    transmitting the updated classification model to at least one of the first client device or a second client device.

2. The system of claim 1, wherein:
  the operations further comprise receiving additional data associated with a classification model output; and
  training the meta-model is based on the additional data.

3. The system of claim 2, wherein the additional data comprises at least one of an environmental condition, a time, or a location.

4. The system of claim 1, wherein:
  the operations further comprise generating a meta-model; and
  training the meta-model comprises training the generated meta-model.

5. The system of claim 1, wherein training the meta-model comprises using a model trainer configured to tune at least one hyperparameter of the meta-model.

6. The system of claim 5, wherein generating the meta-model output comprises identifying a relationship between the first feature data and the classification data, the relationship comprising at least one of a correlation, a goodness of fit metric, or a regression result.

7. The system of claim 5, the operations further comprising:
  updating, based on the meta-model output, the data collection protocol comprising data collection parameters configured to change data collection at the first client device; and
  transmitting the updated data collection protocol to the first client device.

8. The system of claim 7, wherein updating the data collection protocol comprises generating a check based on an environmental condition.

9. The system of claim 7, wherein updating the data collection protocol comprises generating a check based on an environmental condition.

10. The system of claim 1, wherein:
  the first data sample comprises image data; and
  the classification model comprises a convolutional neural network.

11. The system of claim 1, wherein:
  the operations comprise generating a performance metric based on the meta-model output; and
  updating the classification model comprises training the classification model based on the performance metric.

12. The system of claim 1, wherein training the meta-model to predict the classification data comprises training the meta-model to predict the classification data based on third feature data from a third client device.

13. The system of claim 1, wherein the meta-model comprises a statistical model.

14. The system of claim 1, wherein the first feature data is associated with a feature model comprising at least one of an edge detection model or an object detection model.

15. The system of claim 1, wherein the classification model comprises a convolutional neural network.

16. The system of claim 1, wherein the first or second client device is a mobile device.

17. A method for improving classification results, comprising:
  receiving classification data from a first client device having a classification model and a feature model configured to extract a first data feature from a first data sample, the classification data comprising:
a classification result of the first data sample, the classification result generated by the classification model and in response to user input at the first client device; and
a level of confidence that the classification result is accurate;
receiving, from the first client device, first feature data corresponding to the classification data, the first feature data comprising:
the first data feature extracted from the first data sample by the feature model at the first client device; and
a data quality metric of the first data feature describing the first data sample, wherein the data quality metric comprises a metric of image quality, a brightness metric, a blurriness metric, a contrast metric, or a metric associated with an image subject factor;
training a meta-model at a device distinct from the first client device to predict a classification result based on the classification data received from the first client device and the data quality metric;
processing the first data feature and the data quality metric, using the trained meta-model, to generate a meta-model output comprising a reason for failures of the classification result caused by metrics relating to image quality, brightness, blurriness, contrast, or image subject factors;
determining, based on the reason for failures of the classification result as found in the meta-model output, a factor that led to a failure of the classification model;
updating the classification model based on a user input received at the device separate from the first client device, the meta-model output, and the determined factor, the updated classification model being configured to classify a second data sample based on a second feature data of the second data sample;
updating, based on the meta-model output, a data collection protocol to avoid collecting data contributing to the factor that led to the failure of the classification model, the data collection protocol comprising data collection parameters configured to change data collection at the first or second client device;
a prompt for user input; and
commands to collect data based on received user input; and
transmitting the updated classification model and the updated data collection protocol to at least one of the first client device or a second client device.

18. A method for improving classification results, comprising:
receiving a classification model output from a first client device having a classification model and a feature model configured to extract a first data feature from a first data sample, the classification model output comprising:
a classification result of the first data sample, the classification result generated by the classification model and in response to user input at the first client device; and
a level of confidence that the classification result is accurate;
receiving a feature model output extracted from the first data sample by the feature model, the feature model output corresponding to the classification model output, the feature model output comprising at least one of a blurriness metric, a contract metric, or a brightness metric;
receiving a data quality metric of the first data feature describing the first data sample, wherein the data quality metric comprises a metric of image quality, a brightness metric, a blurriness metric, a contrast metric, or a metric associated with an image subject factor;
receiving additional data associated with the classification model output, the associated data comprising at least one of an environmental condition, a time, or a location;
training a meta-model at a device distinct from the first client device to predict a classification result based on the classification data received from the first client device, the feature model output, the data quality metric, and the additional data;
processing the first data feature and the data quality metric, using the trained meta-model, to generate a meta-model output comprising a reason for failures of the classification result caused by metrics relating to image quality, brightness, blurriness, contrast, or image subject factors, or the additional data, and an association between a factor and a classification model failure;
generating a performance metric based on the reason for failures of the classification result as found in meta-model output;
generating a data collection protocol based on the meta-model output, the data collection protocol comprising a prompt for user input;
updating the classification model based on a user input received at the device separate from the first client device, the meta-model output, and the data collection protocol by training the classification model based on the performance metric and the association between the factor and the classification model failure, the updated classification model being configured to classify a second data sample; and
transmitting the updated classification model to at least one of the first client device or a second client device.

* * * * *